United States Patent

[11] 3,546,351

| [72] | Inventor | Harry E. Bryan<br>2817 Fondren, Dallas, Texas 75206 |
|---|---|---|
| [21] | Appl. No. | 732,685 |
| [22] | Filed | May 28, 1968 |
| [45] | Patented | Dec. 8, 1970 |

[54] NAVIGATION TRAINING DEVICE
6 Claims, 3 Drawing Figs.

[52] U.S. Cl. .................................................. 35/10.2,
35/12; 40/130; 240/1
[51] Int. Cl. .................................................... G09b 9/02
[50] Field of Search ............................................. 35/10.2, 12;
40/130(K), 142(A); 240/1(EI)

[56] References Cited
UNITED STATES PATENTS

| 2,071,284 | 2/1937 | Hyland | 40/130X |
| 2,226,726 | 12/1940 | Kramar | 35/10.2 |
| 2,418,834 | 4/1947 | Hartman | 35/10.2 |
| 2,431,827 | 12/1947 | Rado | 40/112 |
| 2,811,356 | 10/1957 | Reed | 40/142X |
| 3,027,669 | 4/1962 | Hardesty | 40/130 |

*Primary Examiner*—Malcolm A. Morrison
*Assistant Examiner*—Felix D. Gruber
*Attorneys*—Jack A. Kanz and Kenneth R. Glaser

ABSTRACT: Disclosed is a navigation training device for use in teaching the principles and proper use of airborne radio automatic direction finding equipment and navigation. The device includes a surface plane with a magnetic center and a plurality of illuminatable lines radiating outwardly from the center. The lines are labeled to indicate compass courses with respect to the center. The device includes a moveable facsimile aircraft with a pointer mounted thereon which is attracted toward the magnetic center. A set of instruction and guidance procedures are provided to instruct the student in operation and understanding of the training device and automatic direction finding navigation.

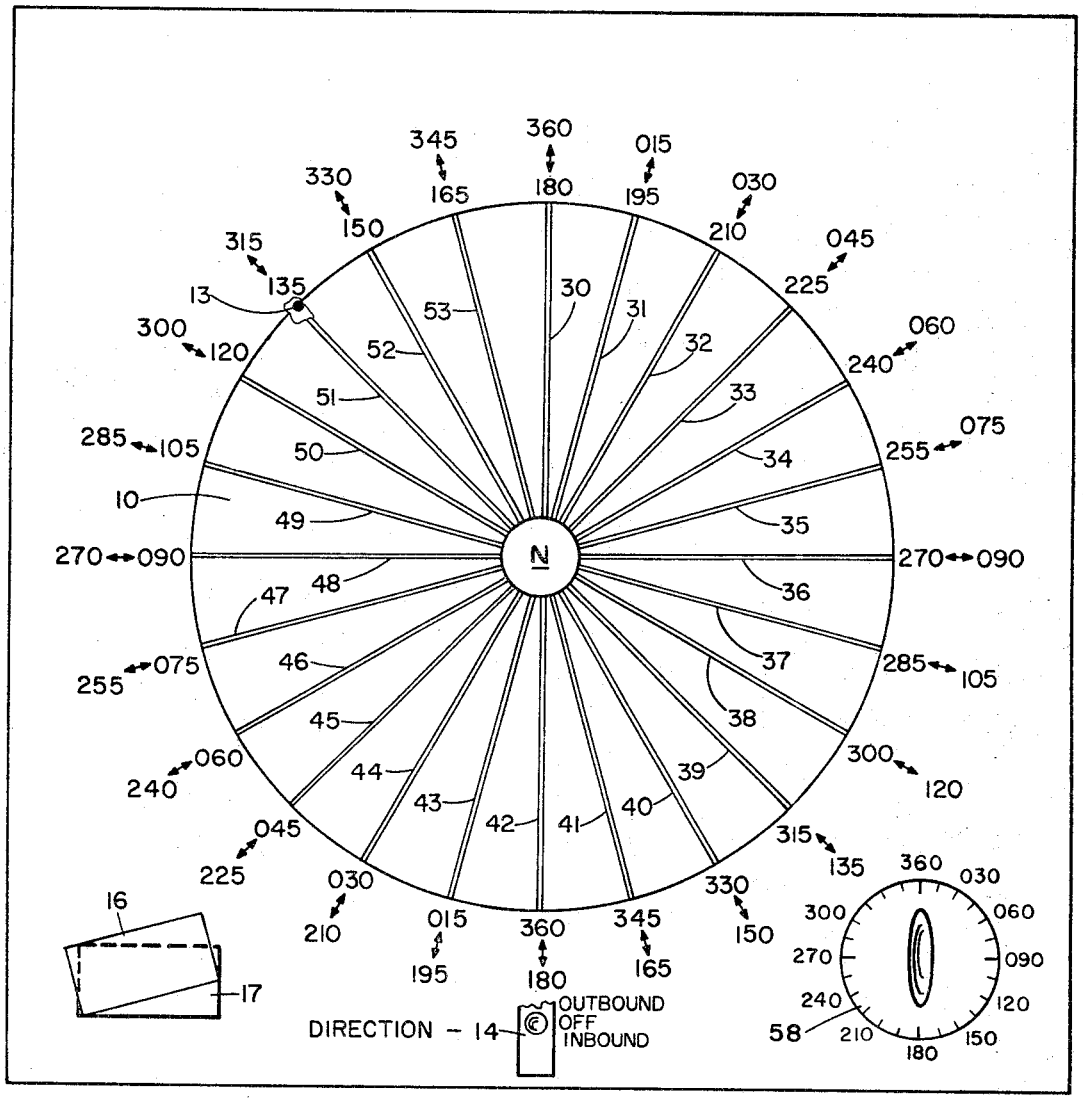
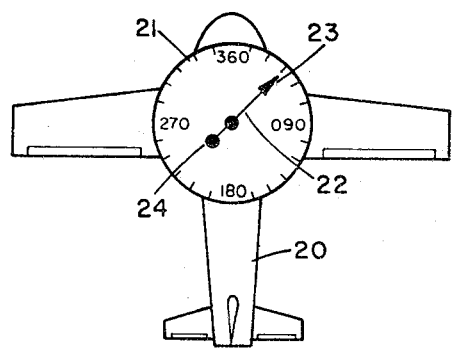
FIG. 1
FIG. 2
HARRY E. BRYAN
INVENTOR.
BY Jack A Kanz
ATTORNEY.

NAVIGATION TRAINING DEVICE

This invention relates to visual teaching apparatus for use in instruction of the use of radio navigation. More particularly, it relates to an apparatus for use by the student pilot, navigation instructor, or any pilot for teaching and instruction in the use and understanding of radio navigation equipment, particularly automatic direction finding equipment.

The automatic direction finding system of aerial radio navigation (referred to as the ADF) consists of a ground transmitting station emitting a radio signal which is nondirectional and an airborne receiver. The airborne radio receiver has a loop antenna which automatically rotates to position itself to receive the maximum signal strength. Maximum signal strength, of course, is achieved when the plane of the loop antenna is normal to a straight line drawn along the shortest distance between the radiation source and the aircraft. The rotating antenna is coupled to a pointer situated in a dial face on the instrument panel of the aircraft so that the pointer always points toward the ground radio station.

The dial face under the pointer is calibrated clockwise from a point designated 0° at the top. The 0° position represents the nose of the aircraft; the 090° position represents the right wing tip; 180° represents the tail of the aircraft; and the 270° position represents the left wing tip. By turning the aircraft heading until the pointer indicates the 0° position on the dial, the pilot may orient his aircraft directly toward the ground station. By turning the aircraft until the 180° position is indicated by the pointer, the pilot will orient his aircraft on a heading directly away from the station.

Since the ADF is one of the primary reference sources available to a pilot/navigator, and since the ADF system is also used in conjunction with the ILS system for sensing the compass locator ground station at the outer marker, it is imperative that pilot/navigators thoroughly understand its operation and use. Much of the difficulty encountered by students in mastering the use of ADF is directly related to the student's inability to immediately graphically visualize the navigation problem when presented in stated form. Furthermore, confusion generally arises as to the correct terminology to be used in identifying the particular course the student is attempting to intercept or navigate. It is therefore an object of this invention to provide a training device which presents a graphic illustration of the navigation problem under study. Another object is to provide an inexpensive training device which illustrates the use of ADF systems and which may be used by a student at his leisure to practice until he becomes fully competent to understand and use use A unique feature of the invention is the provision of a simulated field and aircraft instrument which duplicates actual cockpit instrument indicators. Thus the student may be readily interrogated and tested to determine his retained understanding of the system. Other objects, features, and advantages will become more readily understood from the following detailed description taken in connection with the appended claims and attached drawings in which:

FIG. 1 is a top plan view of the simulated radiation field;

FIG. 2 is a top plan view of the facsimile aircraft supporting an indicating pointer.

Figure 3:
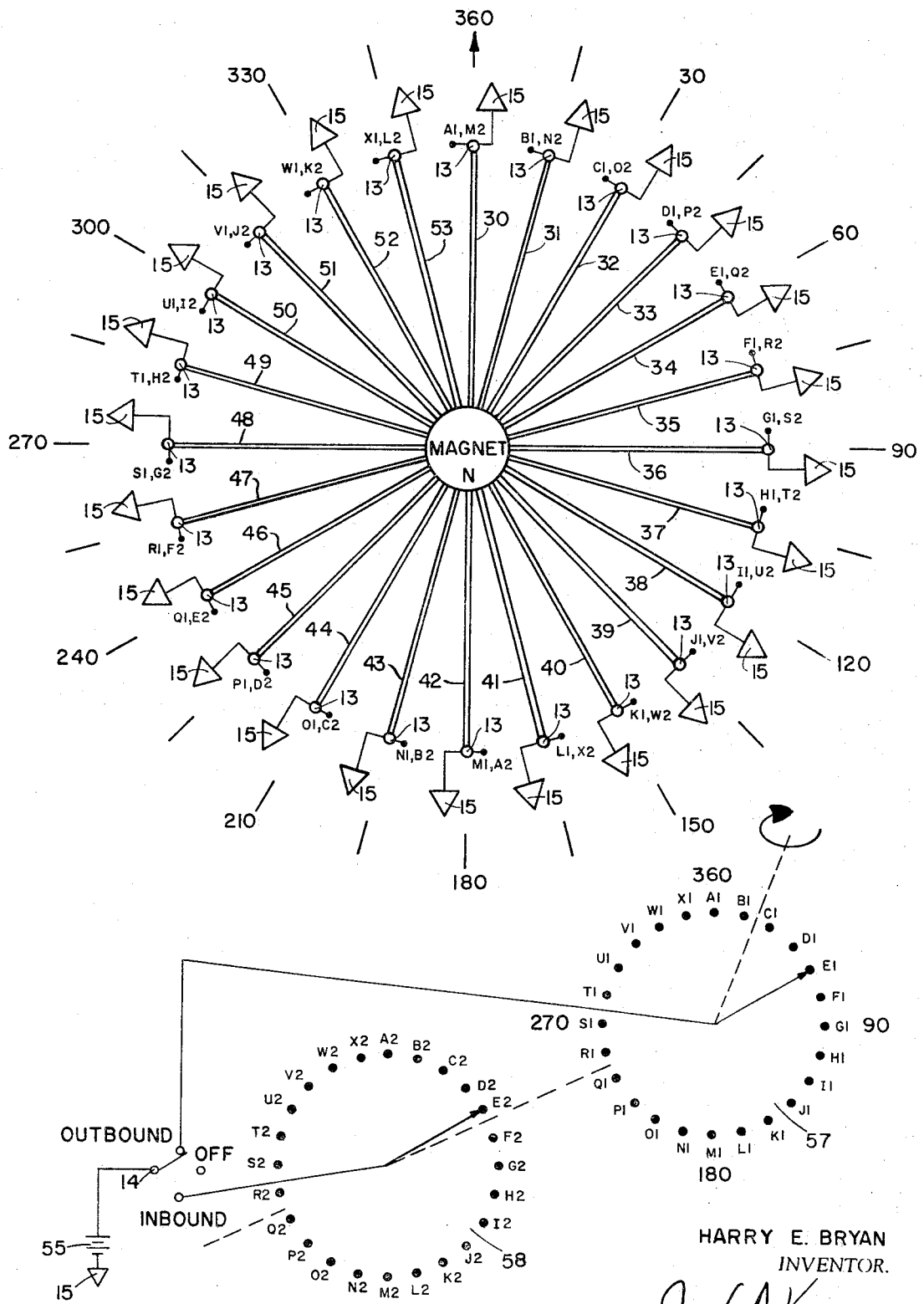
FIG. 3 is a schematic illustration of the electrical circuitry of the device of FIG. 1.

In accordance with the invention, a training device is provided which includes a simulated radio ground station transmission field and a facsimile aircraft incorporating a dial and pointer which automatically points toward the center of the simulated field. The simulated field has a magnet 11 located at its center and a plurality of lines extending radially therefrom. Each of the radial lines are designated by appropriate markers indicating its azimuthal deviation from 0/360°. Light sources 13 are provided which selectively illuminate each of the radial lines 12 as desired.

A facsimile aircraft 20 is provided which has a meter face 21 mounted on the top thereof. A magnetic pointer is mounted on the meter face so that the pointer is attracted to and always points toward the magnet 11. Thus the student may place the aircraft 20 on the simulated field and the pointer will always point toward the magnet, regardless of the aircraft heading.

Referring now to FIG. 1, there is illustrated the simulated radiation field of the device. The simulated field includes a centrally located disc 10 with a magnet 11 mounted at the center thereof. Extending radially from the magnet 11 are a series of transparent strips 30—53. Disc 10 is preferrably a relatively smooth opaque plastic disc approximately 18 inches in diameter. Magnet 11 and strips 30—53 are preferrably mounted in the surface of the plastic of the disc 10 so that the composite presents a relatively smooth surface.

Magnet 11 is preferrably a small cylinder magnet and is mounted vertically so that the north end of the magnet is at the top and exposed to the surface of the disc. The remainder of the simulated field should be of nonmagnetic material. If desired, the south end of magnet 11 may contact a sheet of ferrous material below (not shown) and extending parallel to the surface of disc 10 which terminates at the boundary of disc 10. Such a sheet of ferrous material would serve to extend the south pole of the magnet 11 to the periphery of disc 10.

A simulated aircraft 20, as shown in FIG. 2, has a meter face 21 mounted on the top surface thereof. A rotatable pointer 22 is mounted in the center of the meter face. Pointer 22 is essentially a bar magnet having a pointer end 23 and a counterbalance end 24. In order that the pointer 22 always points toward the magnet 11 in the simulated field, pointer end 23 should be magnetized south and the counterbalanced end 24 magnetized north.

The face of meter 21 and the pivotal pointer 22 simulate the ADF dial and pointer in the real aircraft cockpit. Accordingly, the meter face 21 has indicating markers positioned around the periphery thereof in suitable increments. The 0° is at the nose of the aircraft and corresponding azimuthal deviations therefrom positioned at the corresponding points clockwise around the meter face.

It will be appreciated that any time the facsimile aircraft 20 is positioned on or near the simulated field 10, the south end 23 of the pointer will be attracted to the north end of magnet 11. Therefore the pointer 22 always points toward the center of the simulated field regardless of the position or heading of the aircraft. Therefore it will be appreciated that the simulated ADF meter mounted on the airplane faithfully duplicates the informational display of the ADF meter in a real aircraft cockpit since it, like the real ADF indicator, always points toward the ground station.

Referring to the simulated field, it will be noted that each plastic strip 30—53 simulates a course which may be flown either to or from the station. In other words, each course may have two headings. An aircraft may either be flying toward the station or away from the station along any of the courses indicated. Thus, an aircraft proceeding in a northerly direction away from the station would be said to be flying outbound on the 360° course. The correct terminology for his course is thus 360° outbound. However, if the aircraft is flying toward the station in a northerly direction, he is flying along the path indicated by the 180° course. Since he is flying toward the station in a northerly direction, however, his course designation is 360° inbound.

In order to acquaint the student with the proper terminology and designation of the course he is attempting to intercept or navigate, the training device of this invention incorporates indicating means which illuminate the appropriate strip 30—53 which lies along the course selected for navigation. The illuminating sources and the circuitry therefor are schematically illustrated in FIG. 3.

Each of the strips 30—53 is positioned along a line extending radially from the magnet 11. The strips represent the path of an aircraft traveling either toward or away from the transmitter represented by magnet 11. The strips are preferrably narrow strips of plexiglass fitted into appropriate slots in the disc 10. Light sources 13 are positioned adjacent the ends of the strips. All surfaces of the strips 30—53 are preferrably coated with a reflective material except the exposed top surface and the end adjacent the light sources 13. Thus when any light source 13 is illuminated, the strip positioned adjacent thereto will appear substantially uniformly lighted by light being internally reflected throughout the length of the strip. Alternatively, the plexiglass strip may be polished on all sides and the sides of the slot coated with reflective material.

As indicated in FIG. 3, light sources 13 are positioned adjacent the outer end of each of strips 30—53. If desired, light sources may also be positioned adjacent the ends of the strips which approach the magnet 11, or pairs of light sources 13 used, one on each end of the strip.

Selective illumination of strips 30—53 is indicated by the schematic sketch of FIG. 3. The circuitry shown is represented by a voltage source 55 which has one side grounded. The other side of voltage source 55 is connected to the three-position switch 14 which is shown in FIG. 1. Switch 14 selectively switches voltage source between the common terminal of a dual wafer switch. The wafers of the dual wafer switch are schematically indicated at 56 and 57. Each of wafers 56 and 57 are mounted on a central shaft which is rotated by knob 58. Each wafer has 24 positions and the positions of the wafers 56 and 57 are connected to light sources 13 in the order indicated in FIG. 3. Thus it will be seen that with the switch 14 in the outbound position, voltage is supplied to wafer 57. As knob 58 is rotated voltage source 55 is alternately connected to each of the points indicated in wafer 57. Thus, for example, with the selector switch 14 in the outbound position and knob 58 rotated until the pointer thereon indicates the 360° position, voltage will be supplied to contact point labeled $A_1$ causing illumination of light source 13. Illumination of light source 13 causes illumination of strip 30 which represents the 360° outbound course. By changing selector switch 14 to the inbound position, voltage is switched to point $A_2$ in wafer 56, thus illuminating strip 42 which is 180° from strip 30. Strip 42 thus indicates the path of an aircraft traveling on the 360° inbound course.

It should be noted that by rotating knob 58 to select the 180° heading voltage will be supplied to point $M_1$ which the selector switch 14 is in the outbound position and strip 42 will be illuminated. Strip 42 will thus indicate the 180° outbound course. When selector switch 14 is switched to the inbound position, strip 30 is illuminated indicating the path of the aircraft on the 180° inbound course.

In the schematic illustration of FIG. 3, each of light sources 13 is connected to a point indicated on wafer 56 and on wafer 57 and the opposite side of the light source 13 connected to ground as indicated by the ground points 15.

Referring now to FIG. 1, it will be noted that each of strips 30—53 is appropriately labeled by course markers on opposite ends of double ended arrows. The direction of the arrow indicates the direction of travel of the aircraft on the course marker indicated.

In using the trainer of this invention the student places the facsimile aircraft 20 on the surface 10 of the trainer indicated in FIG. 1. Pointer 22 automatically is attracted toward the magnet 11, thus the pointer simulates the ADF pointer in the cockpit always indicating the direction of the ground station. The student then rotates knob 58 to indicate the position of the course for which he is cleared to navigate. For example, if his clearance is 090° inbound, the selector switch 14 is switched to inbound and knob 58 is rotated until the point of the arrow indicates 090°. By referring to FIG. 3 it will be noted that strip 48 will be illuminated which illuminates the 090° inbound course. Thus the student readily visualizes the course he must travel toward the station on the path illuminated.

A series of instruction cards 16 may be conveniently housed in a depression 17 on the surface of the trainer as shown in FIG. 1. The cards 16 may contain printed instructions or pose specific navigation problems for the student. By manipulation of switch 14, knob 58 and the facsimile aircraft 20, the student may set up the problem given on the instruction card. By reference to the illuminated track which appears on the simulated field the student may then exercise the orientation, interception and tracking procedure as directed on the card for maneuvering the facsimile aircraft and observing the ADF pointer position. Solutions to specific problems may be printed on the reverse side of the cards so that the student may check his solution against the correct solution to the particular navigation problem stated. Through the use of the trainer and the instruction cards the student may become familiar with the terminology and correct use of the ADF system.

Although the invention has been explained with particular reference to a DC circuit, it will be readily understood by those skilled in the art that various other systems may be used to illuminate or appropriately indicate the desired course on the simulated field. Likewise, alternate switching arrangements may be used to provide the features described herein.

It is to be understood that although the invention has been described with particular reference to specific embodiments thereof, the form of the invention as shown and described is to be taken as a preferred embodiment of same and that various changes and modifications may be resorted to without departing from the spirit and scope of the invention as defined by the appended claims.

I claim:

1. An apparatus comprising:
   a. a substantially planar surface;
   b. a magnet disposed substantially in the center of said surface;
   c. fixed indicating means extending radially from said magnet in the plane of said surface;
   d. means for individually illuminating said fixed indicating means;
   e. a facsimile aircraft adapted to be moved about said surface; and
   f. a pointer mounted on said aircraft and responsive to the position of said magnet relative to said pointer.

2. The apparatus of claim 1 wherein each of said fixed indicating means is identified by a double-ended arrow, each end of said arrow pointing to a marker indicating the clockwise azimuthal deviation of such indicating means from points designated 0° and 180°.

3. The apparatus of claim 1 wherein said fixed indicating means comprises a plurality of relatively narrow strips of substantially transparent material.

4. The apparatus of claim 3 wherein said substantially transparent material is plexiglass.

5. The apparatus of claim 1 wherein said means for individually illuminating said fixed indicating means comprises a plurality of light sources, each positioned adjacent one end of each of said fixed indicating means, and switching means for selectively interconnecting each of said light sources with a voltage source.

6. A training device for teaching radio navigation comprising:
   a. a substantially flat surface for representing a simulated radiation field;
   b. a magnet disposed substantially in the center of said surface;
   c. indicating lines extending irregularly from said magnet;
   d. means for selectively illuminating individual ones of said indicating lines;
   e. a moveable facsimile aircraft having a magnetic pointer mounted thereon; and
   f. cards containing printed instructions for operating the means for selectively illuminating and for positioning said movable facsimile aircraft.

UNITED STATES PATENT OFFICE
CERTIFICATE OF CORRECTION

Patent No. 3,546,351　　　　　　　　Dated December 8, 1970

Inventor(s) Harry E. Bryan

It is certified that error appears in the above-identified patent and that said Letters Patent are hereby corrected as shown below:

Column 1, line 48, cancel "use", second occurrence, and insert -- real ADF equipment. --.

Signed and sealed this 13th day of April 1971.

(SEAL)
Attest:

EDWARD M. FLETCHER, JR.　　　　　　　WILLIAM E. SCHUYLER,
Attesting Officer　　　　　　　　　　Commissioner of Pater